(12) United States Patent
Badr et al.

(10) Patent No.: US 6,877,581 B2
(45) Date of Patent: Apr. 12, 2005

(54) DEPLOYABLE POWER GENERATION AND DISTRIBUTION SYSTEM

(75) Inventors: Mazen Badr, Fairfax, VA (US); Mel Chison, Lynn Haven, FL (US); Donald Cope, Locust Grove, VA (US); Norman Edwards, Springfield, VA (US); Wayne Moore, Gaithersburg, MD (US)

(73) Assignee: Radian, Inc., Alexandria, VA (US)

( * ) Notice: Subject to any disclaimer, the term of this patent is extended or adjusted under 35 U.S.C. 154(b) by 32 days.

(21) Appl. No.: 10/259,867

(22) Filed: Sep. 30, 2002

(65) Prior Publication Data

US 2003/0122360 A1 Jul. 3, 2003

Related U.S. Application Data

(60) Provisional application No. 60/325,232, filed on Sep. 28, 2001.

(51) Int. Cl.$^7$ .......................... B62D 21/00; B62D 63/06; B60P 3/00
(52) U.S. Cl. ...................... 180/311; 280/79.6; 280/786; 280/789; 296/24.3; 307/80
(58) Field of Search ................................ 180/311, 312; 280/786, 789, 79.6; 318/17; 296/24.3, 182.1, 184.1; 290/1 A; 307/80, 85, 86; 310/113; 700/22

(56) References Cited

U.S. PATENT DOCUMENTS

| | | | | |
|---|---|---|---|---|
| 1,649,038 A | * | 11/1927 | Moss | 307/81 |
| 1,927,797 A | * | 9/1933 | Hoffmann | 307/62 |
| 2,763,383 A | * | 9/1956 | McCoy | 414/542 |
| 3,194,525 A | * | 7/1965 | Webb | 410/46 |
| 3,339,079 A | * | 8/1967 | Kessler | 307/29 |
| 3,703,663 A | * | 11/1972 | Wagner | 361/20 |
| 3,743,314 A | * | 7/1973 | Archer | 280/786 |
| 4,520,275 A | * | 5/1985 | Marusik | 307/64 |
| 4,580,843 A | * | 4/1986 | Lund | 298/18 |
| 5,253,891 A | * | 10/1993 | Carlin et al. | 280/422 |
| 5,374,082 A | * | 12/1994 | Smith | 280/789 |
| 5,806,868 A | * | 9/1998 | Collins | 280/79.6 |
| 6,116,533 A | * | 9/2000 | Elder | 242/594.4 |
| 6,334,746 B1 | * | 1/2002 | Nguyen et al. | 410/44 |
| 6,522,030 B1 | * | 2/2003 | Wall et al. | 307/43 |
| 6,633,799 B2 | * | 10/2003 | Krakovich et al. | 700/286 |
| 6,735,704 B1 | * | 5/2004 | Butka et al. | 713/300 |
| 6,765,304 B2 | * | 7/2004 | Baten et al. | 290/1 A |
| 2002/0089234 A1 | * | 7/2002 | Gilbreth et al. | 307/80 |
| 2003/0038438 A1 | * | 2/2003 | Maarten Van Oosten | 280/79.6 |

* cited by examiner

Primary Examiner—Paul N. Dickson
Assistant Examiner—Laura B. Rosenberg
(74) Attorney, Agent, or Firm—Duane Morris LLP

(57) ABSTRACT

A networkable engine-generator control system for use with mobile generators mounted on a frame with ground engaging wheels enabling air transport. Each control system consists of a microprocessor based controller and associated field inputs and outputs. Each processor also includes asynchronous communications allowing it to poll external devices from one port and communicate over a network out of another port. Each onboard generator is operated based on runtime hours and system load. The controller monitors engine and generator parameters and makes this information available to an operator using an external monitoring software package. Local operation of each generator is also available on the trailer itself. When operated in conjunction with other systems any one of the controllers may be made the master. The other controllers then automatically are polled by the master. The master coordinates generator operations on all networked systems. The frame utilizing a spine truss and outer frame.

38 Claims, 8 Drawing Sheets

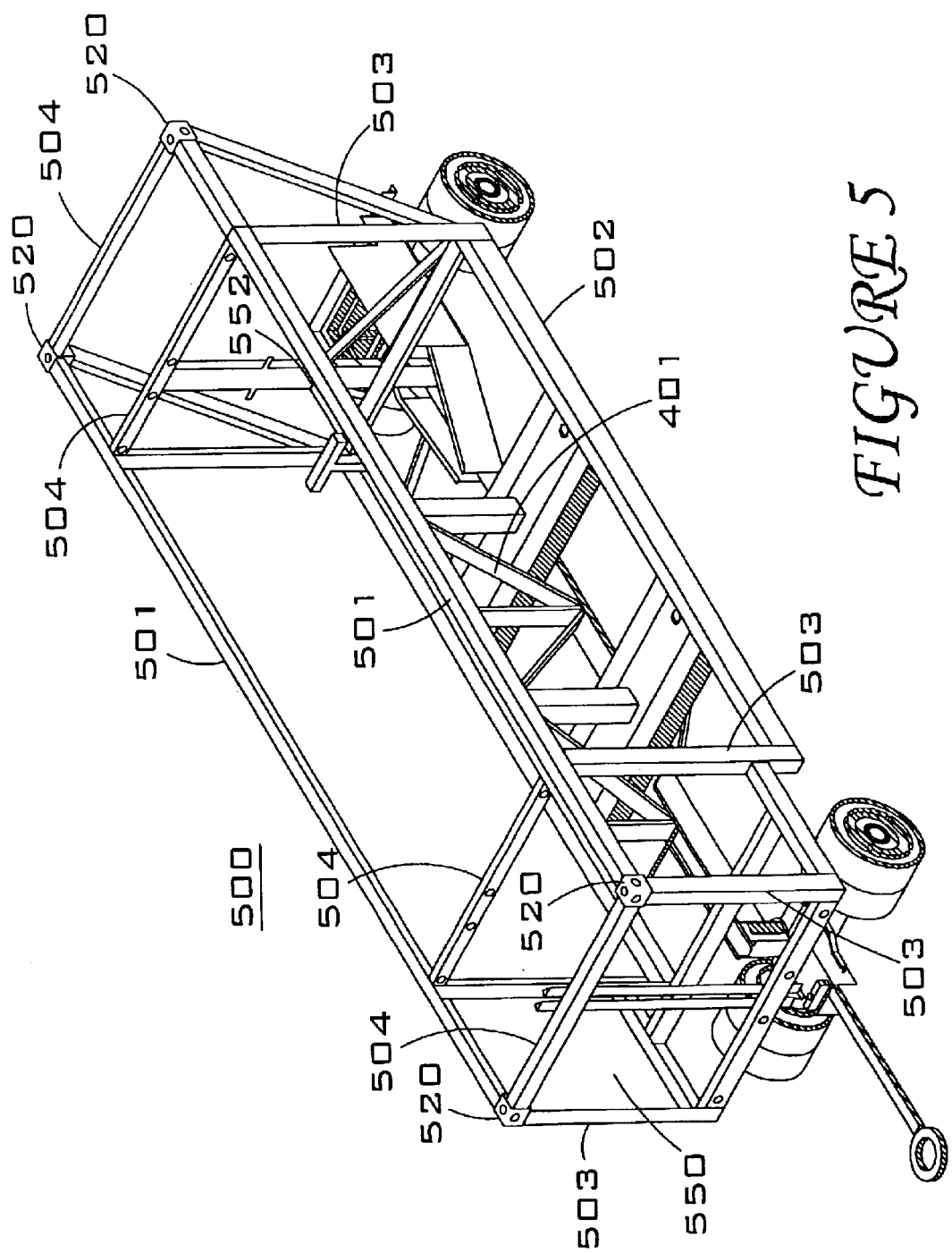

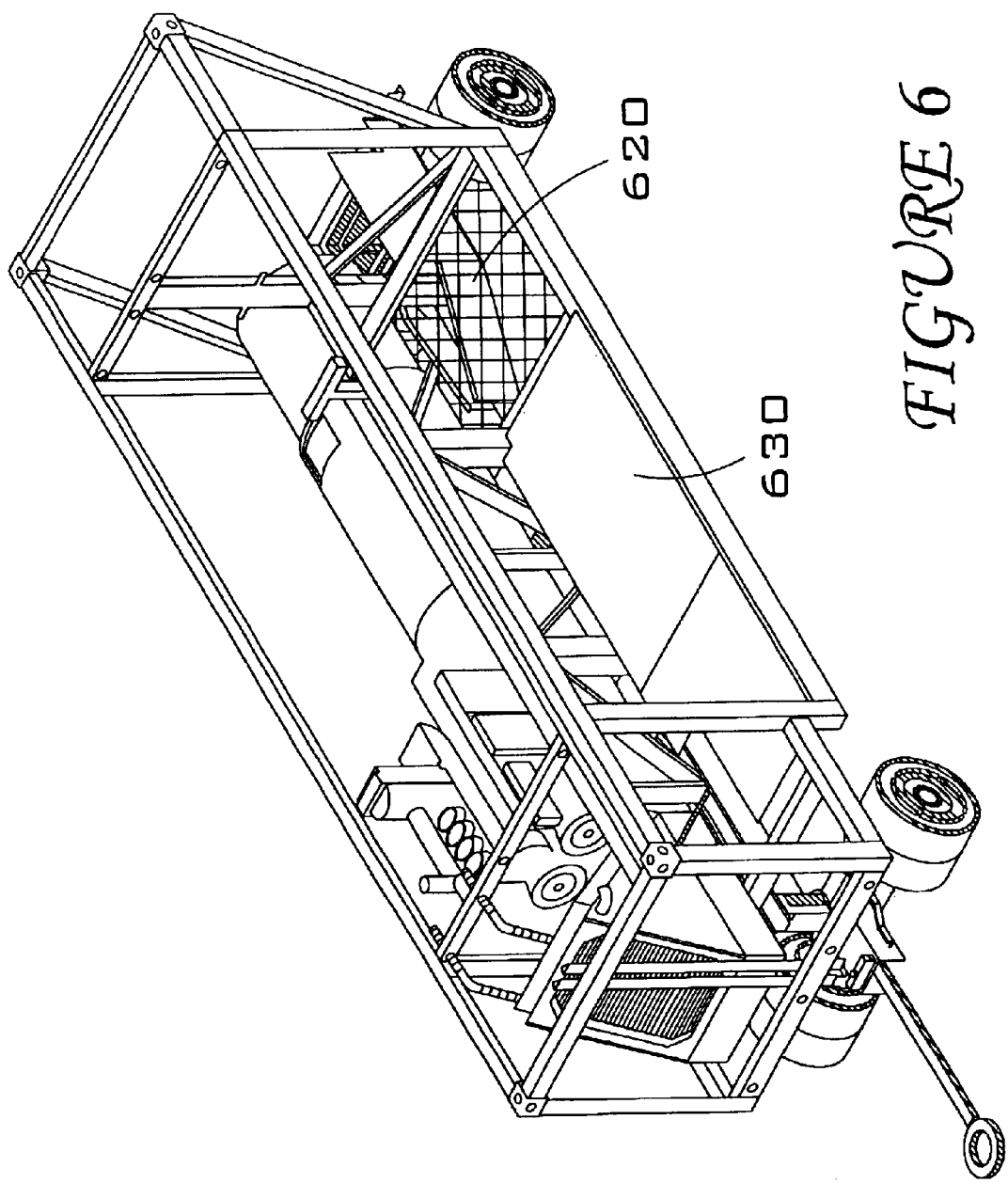

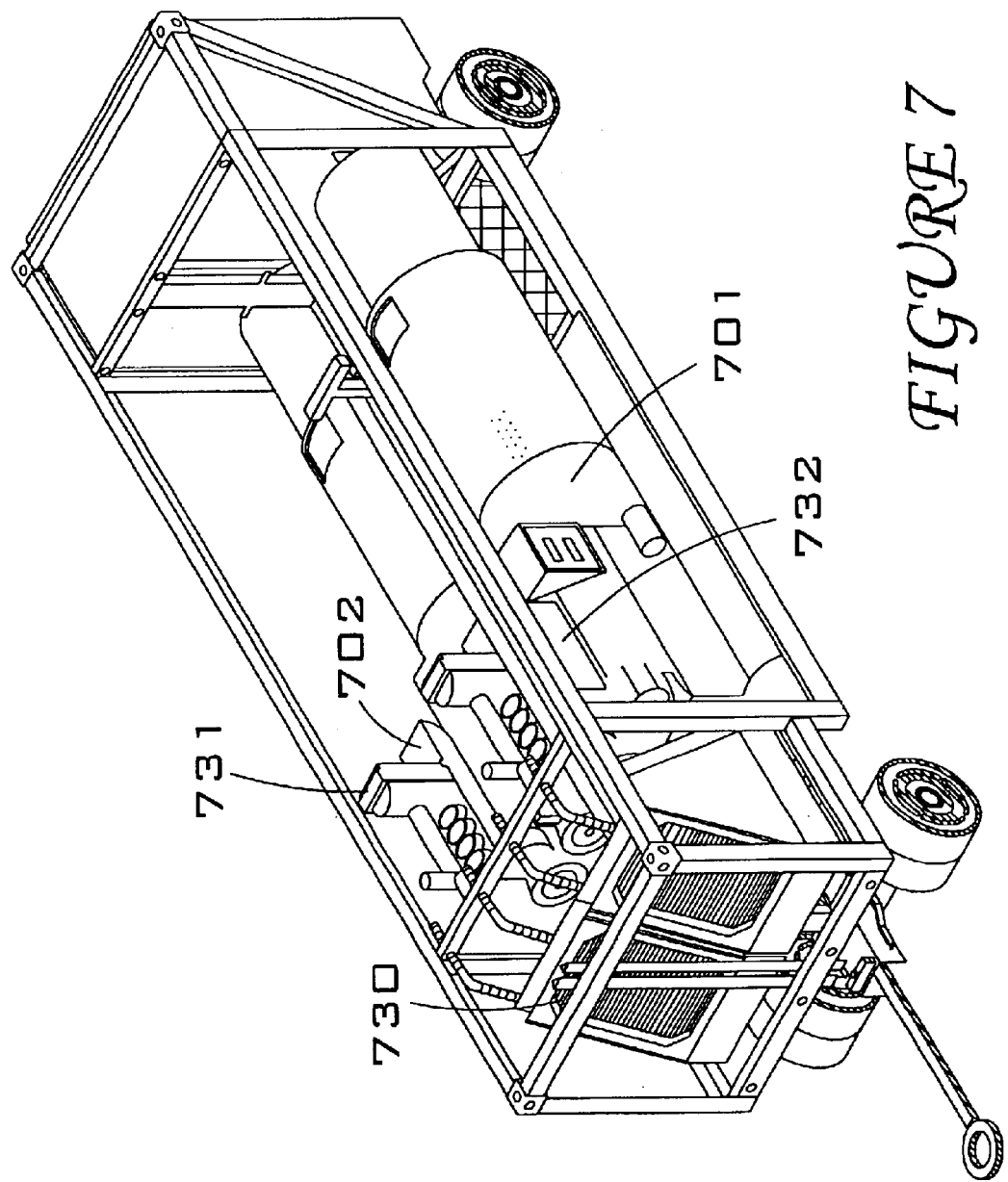

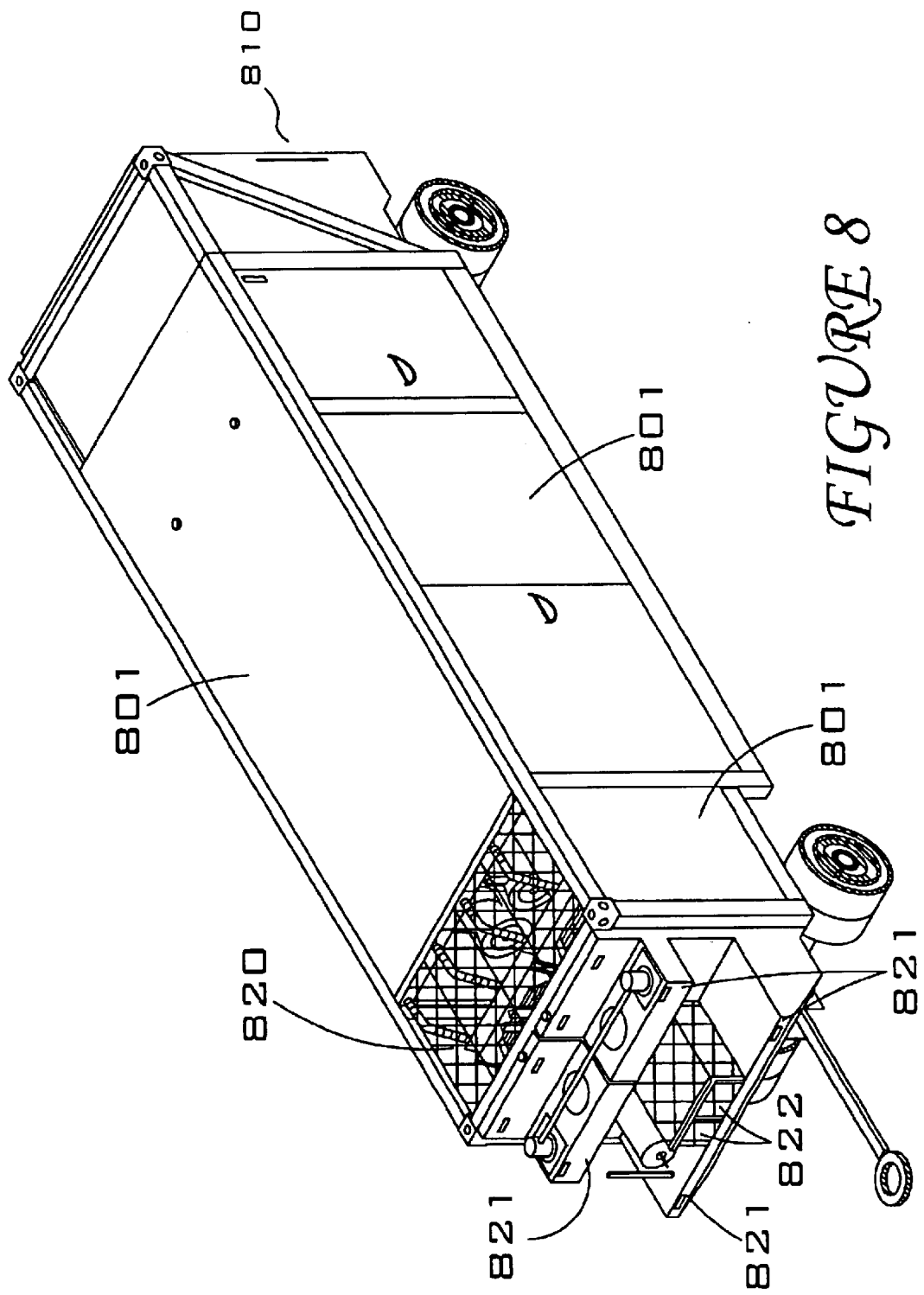

DEPLOYABLE POWER GENERATION AND DISTRIBUTION SYSTEM

RELATED APPLICATIONS

This application claims the priority of U.S. Provisional Application No. 60/325,232 filed Sep. 28, 2001.

BACKGROUND

Mobile power generating systems were developed to provide electrical power that to areas where electrical power is otherwise not available. The reasons for the unavailability of electrical resources are many including, not having access to the conventional power grid due to the remote nature of the location, demand for electricity in excess of the amount supplied by the conventional power grid, the unavailability of the power grid due to natural disasters, maintenance, etc. The electrical load requirements, in terms of generating capacity and duty cycle, for mobile power generating systems varies drastically. For example one mobile generating deployment may require only a small load capacity for sporadic or light duty use, while another deployment may require a long-term continuous load capacity working in conjunction to provide load support for a overburdened electrical grid.

Mobile power generating systems by their vary nature must be easily transportable, via several modes, air, ground and sea. The transportability requirement extends to logistic equipment required to set up and operate the generating system. To facilitate this mobility, mobile power generating systems beneficially need to be deployable in transport aircraft, such as the C-130 transport aircraft. The mobility requirement imposes several restraints not pertinent for other non-mobile generator systems, such as gross weight, weight per axle, psi at deck interfaces, height, width, center of gravity and rigidity. With respect to air mobility, the U.S. military has issued standards (MIL-STD-1791) governing specific size and load constraints for deployable generator systems. In addition as air-transportation utilizes a limited number of assets and is costly, efficiencies in terms of specific weight (lbs/KW) is also desirable. Thus the structure, weight, load distribution and specific weight of mobile generating systems become significant factors in their design, while remaining relatively insignificant in non air-transportable, fixed generating systems.

The stringent size and load requirements for air mobility effects the ability to provide a robust redundant power generation system. For example, previously it has been impractical to provide a single platform providing plural generators due to the decreased power generation capability that results from reducing the size of the generators in order to keep the platform within the weight specifications. Thus prior art mobile platforms consist of a single generating unit, sacrificing the redundancy provided by a dual generator system.

As the general nature of mobile power generating system deployments are transient, operator and maintenance personal are likely not to be as cognizant of the particularities of different systems in regards to their operation and maintenance. Furthermore, a service history would not necessarily be readily available at the deployment site. Thus, unlike fixed power generation systems which may consist of a plurality of generators which operate cooperatively through the life time of the power generation system, a mobile power generation systems may consist of a plurality of mobile generators which have not previously operated together as a system. Because the makeup of the mobile generation system may be made on an adhoc basis, i.e., based on the availability of the mobile generators for transport on short notice, it is important that processors controlling the operation of the mobile generators take into account the specific history of the mobile generators, including runtime in coordinating the utilization of the mobile generators. This aspect is particularly important where plural generators are contained in a single mobile unit so that the runtime of the combined unit can be divided in a uniform fashion between the plural generators.

Additionally, many deployments of mobile power generating systems are in hostile environments due to inclement weather or combat conditions. Therefore it is desirable for such mobile power generating systems to require a minimum amount of human involvement for operation and maintenance.

For cost, logistic and manpower reasons it is undesirable to purchase, maintain and distribute wide varieties of mobile power generating system tailored to a specific load or duty cycle. Thus there is a need for mobile power generating system that is flexible in configuration and scalable to meet the varying demands efficiently from one deployment to another, as well as a system that operates in a near autonomous fashion without the need for reconfiguration. There is also a need for a mobile power system that is operator friendly requiring only a minimum of training for the operators. These needs also much be accomplished in a system that is easily transportable.

Accordingly, it is an object of the present disclosure to obviate many of the above problems in the prior art and to provide a novel mobile engine-generator comprising n generator sets, the generator sets comprising an engine and a mechanical power to electrical power converter; a main bus operably connecting each of said n generator sets and a power output; a processor operably connected to each of said n generator sets and said main bus; a communication link, said link operably connected to said processor; wherein the processor controls the operation of said main bus and each of said n generator sets. An embodiment of mobile engine-generator also includes a switch operable connected to the processor for switching the processor between master and slave modes; wherein in said slave mode the processor is controlled via the communication link and in said master mode, the processor sends control signals over the communication link.

It is another object of the present disclosure to provide a novel distributed engine-generator system comprising: a plurality of mobile engine-generators interconnected by a communication link, wherein any one of the plurality mobile engine-generators is a master, and the others of the plurality of mobile engine-generators are slaves and the master controls said slaves via said communication link It is yet another object of the present disclosure to provide a novel method for a distributed engine-generator system comprising M power units interconnected by a communication line and interconnected in parallel by a common power bus, wherein one of the M power units is configured as a master and the others of the M power units configured as slaves, each of the M power units comprising n generator sets, of controlling generation capacity by the master comprising the steps of: (a) determining the system load in relation to an upper and lower threshold; (b) sequencing said M power units, 1-M; (c) incrementally bringing online said M power units while the system load exceeds the upper threshold; and (d) decrementally taking offline said M power units while the system load is below the lower threshold.

It is still another object of the present disclosure to provide a novel method of controlling a deployable distributed engine-generator system to provide electrical power to support an electrical load. An embodiment including providing a plurality of mobile engine-generators; connecting the plurality of mobile engine-generators through a common communications link and a common power bus; designating one of the plurality of engine-mobile generators as the lead generator, monitoring the operating parameters of the plurality of mobile engine-generators at the lead engine-generator through the common communications link; controlling the operation of the plurality of engine-generators from the lead generator as a function of the monitored parameters; and, selectively changing the designation of the lead engine-generator among the plurality of engine-generators as a function of the monitored parameters without interrupting the supply of electricity to the electrical load.

It is an additional object of the present disclosure to provide a novel distributed engine-generator system comprising: a plurality of mobile engine-generators, each mobile engine-generator comprising: a frame with ground engaging wheels, at least one engine driven generator carried by said frame, a microprocessor-based controller carried by said frame for monitoring engine and generator parameters and for selectively controlling the operation thereof in response to locally generated operating instructions, programmable software resident within said controller, and remotely generated instructions, said controller having means for visually displaying the monitored parameters and for locally generating operating instructions, and means operatively connected to said controller for asynchronous communication with the controllers of the other ones of said mobile engine-generators and a source of remote operating instructions to provide and receive engine and generator parameters and operating instructions, whereby each of said plurality of mobile engine-generators may be (a) selectively operated independently of the others of said plurality of mobile engine-generators, (b) operated under the remote control of said source of operating instructions, (c) operated under the control of the controller of another one of said plurality of mobile engine-generators and (d) control the operation of others of said plurality of mobile engine-generators.

These and many other objects and advantages of the present disclosure will be readily apparent to one skilled in the art to which the disclosure pertains from a perusal or the claims, the appended drawings, and the following detailed description of the preferred embodiments.

BRIEF DESCRIPTION OF THE DRAWINGS

FIG. 5 is a representation of a spine truss and a frame according to an embodiment of the present disclosure.

FIG. 6 is a representation of a engine-generator installed on the spine truss and frame according to an embodiment of the present disclosure.

FIG. 7 is a representation of two engine-generators and PDC on the spine truss and frame according to an embodiment of the present disclosure.

FIG. 8 is a representation of the outer shell of the mobile engine-generator according to an embodiment of the present disclosure.

DESCRIPTION

Figure 1:
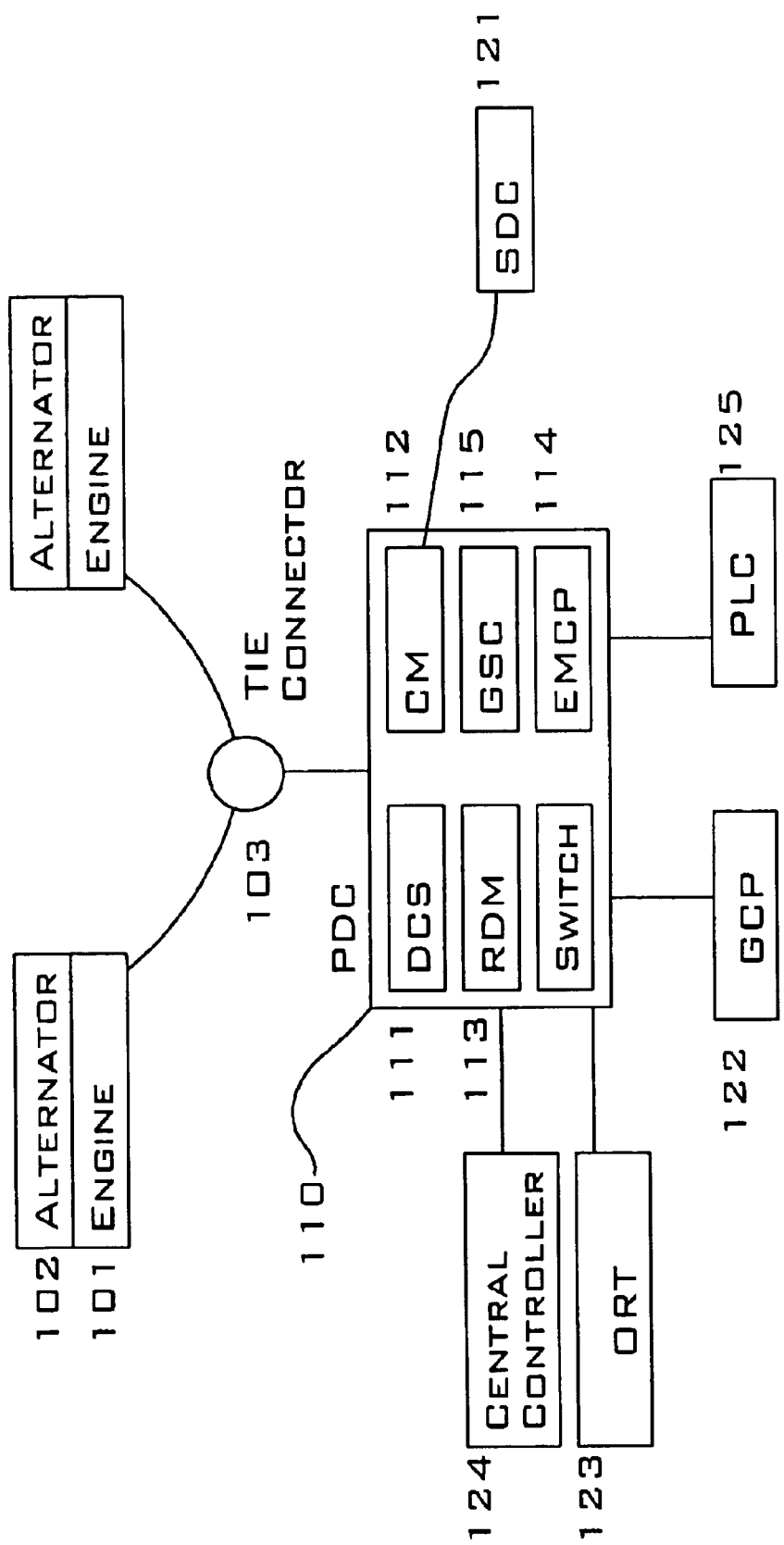
FIG. 1 is a representation of a mobile engine-generator according to an embodiment of the present disclosure.

One embodiment of applicant's disclosure is shown in FIG. 1. The power unit is frame mounted with ground engaging wheels which allows for ground transport and facilitates air transport. The power unit (PU) contains two 460 kW generator sets with a Power Distribution Center (PDC) 110 and an integrated switch gear. The PDCs are integral to the power units; a power unit can supply power to any group of Secondary Distribution Centers (SDC) 121, providing additional flexibility. The power unit is designed to operate as a stand-alone prime power source or interoperable with other systems, power units or commercial grids as described latter herein.

The power unit contains radiators 730, charge air coolers 731, mufflers 732, fuel transfer, and fuel storage as generally shown in FIG. 7 discussed latter herein. Onboard batteries are supplied for starting. Charging is accomplished with a power supply, and an auxiliary power connection for charging the batteries with the power unit in storage. An auxiliary service transformer provides low-voltage power for low voltage service in the power plant area.

The PDC 110 is a microprocessor based control system designed to provide flexibility to the user. The control logic of the PDC 110 is functional to allow a power unit to operate autonomously, or as a constituent of a larger system. Each unit can be configured to operate alone or can be networked together with other PU's to operate functionally as common power generation system. When networked, one power unit's PDC 110 controller is designated as the master; this master controller, via ethernet, internet or other type of wire or wireless communications, coordinates the operation of all networked systems including other PUs. The PDC 110 of the other PUs function as slave units to the master. The PDC 110 contains a switch for determining the mode of operation. The switch can be mechanical, electronic or software based and as such the mode of the PDC 110 can be switched by the operator, by the central controller or the master PU over the communication link.

The PDC 110 provides three critical functions: (1) it controls the set of attached generators through the use of the Electronic Modular Control Panel (EMCP) 114, (2) it provides primary power distribution from the PU to a common bus through a tie connection, and (3) when networked, it provides load management by the establishment of a common network between the Pus by the sensing of load conditions and the automatic load balancing for both kW and kVAR.

The PDC 110 enables a communication link to provide remote control of the power unit and the primary switchgear from a central controller using remote capabilities afforded with a Digital Control System (DCS) 111 and a Communication Module (CM) 112. A Relay Driver Module (RDM) 113 is provided inside the PDC 110 to provide programmable dry contacts controllable via software in the central controller. These contacts can be used to remotely control PDC 110 operations. Together, the DCS 111 , CM 112, and RDM 113 permit the remote control of the PDC 110.

The power unit supplies a main distribution bus. The main distribution bus receives power from the two feeder breakers to a tiebreaker. The main distribution bus interconnects to a common distribution bus via the contactors when network with other PUs.

The EMCP 114 provides full operating control of both of the engine/alternator sets. Both generators can be controlled locally from the PDC 110 at a Generator Control Panel (GCP) 122 for each generator, remotely from a Operator's Remote Terminal (ORT) 123 which is connected to the PDC 110 when required, or from the PDC of another power unit.

In manual operation from the Generator Control Panel (GCP) 122, the operator can start, stop, control, and operate the associated generator and feeder breakers. Additionally, the operator can observe engine and generator parameters at the Generator Set Controls (GSC) 115 such as but not limited to speed, coolant temperature, oil pressure, runtime, and battery voltage of the associated engine and phase voltage, current kilowatts (KW), kilovolt amp reactive (KVAR), apparent power (KVA), power factor, and frequency of the associated generator. There are also current protective relays installed for the generator, tie and feeder breakers.

In automatic operation, the DCS 111 can automatically start the selected generator set, synchronize it to the main power bus, and allow power to be supplied to the load. There may be instances, either in normal or emergency situations, in which the operator wants to reconfigure the primary distribution system. The operator will be provided with the status and have the ability to open/close the generator and feeder contactors Load management functions are enabled by a communications system in the PDC 110 that provides both local control as well as remote control capabilities. The PDC 110 contains a communication network that provides remote control of the generator set and the primary switchgear from the central controller 124 or the lead PU. A Programmable Logic Controller (PLC) 125 working in conjunction with the Communication Module (CM) 112 establishes this link. The CM 112 device polls the GSC(s) 115 for the parameters requested by the CM 112. It translates requests and responses into appropriate protocol for transmission across the link. The PLC 125 periodically polls the CM 112 for the parameters required by to control the system. These parameters are stored on board for access by the PLC 125, lead unit or central controller.

The PLC 125 provides the control logic for automatic operation. Additionally, it retrieves all operating parameters from both GSC 115 modules on the PU and provides the networked controlling between PUs. During manual operations the PLC 125 only provides monitoring capability. During automatic operations, however, the PLC 125 provides all the control algorithms for the various control routines within the PU system. It also allows the ORT 123 to function with the PU(s).

The Ethernet Hub provides the networking capability used by the PUs and the ORT 123. The hub is a 5-port unit with-the fifth port being used for up linking to another PU. Control of the PUs can be at the control panels located on the unit (typical for single-unit operation), or via the PDC 110 of a master PU or via a personal computer (PC), the latter two typical for the multiunit plant configurations. Operation via master PU or PC add considerable flexibility and automation for control of multiple units: automatic starting, paralleling, load sharing, and dropping units off line.

The control system continuously polls the operating onboard generator controllers for engine and generator parameters. The engine parameters monitored are engine speed, coolant temperature, oil pressure, runtime, and battery voltage. Monitored generator parameters are individual phase voltage and current, generator kilowatts (KW), kilovolt amps reactive (KVAR), apparent power (KVA), power factor, and frequency. The control system also monitors various filter differential pressures for maintenance. The control system also polls the generator controller for any alarm or fault conditions. Faults on any generator are recognized by the control system and that unit is taken offline and made unavailable to the controls until it is repaired. The master (or lead) controller in a multiplant configuration recognizes this as a reduction in generator capacity and is able to bring other engine-generators on line as needed.

During single power unit operation the controller determines when to start, stop, and parallel each onboard generator. If the electrical load is within the capacity of one of the two onboard generators, the controller uses an economizing feature to distribute the run time over the two generators. Based on runtime and system load the controller switches the load from one generator to the other to distribute the run time between the generators.

Figure 2:
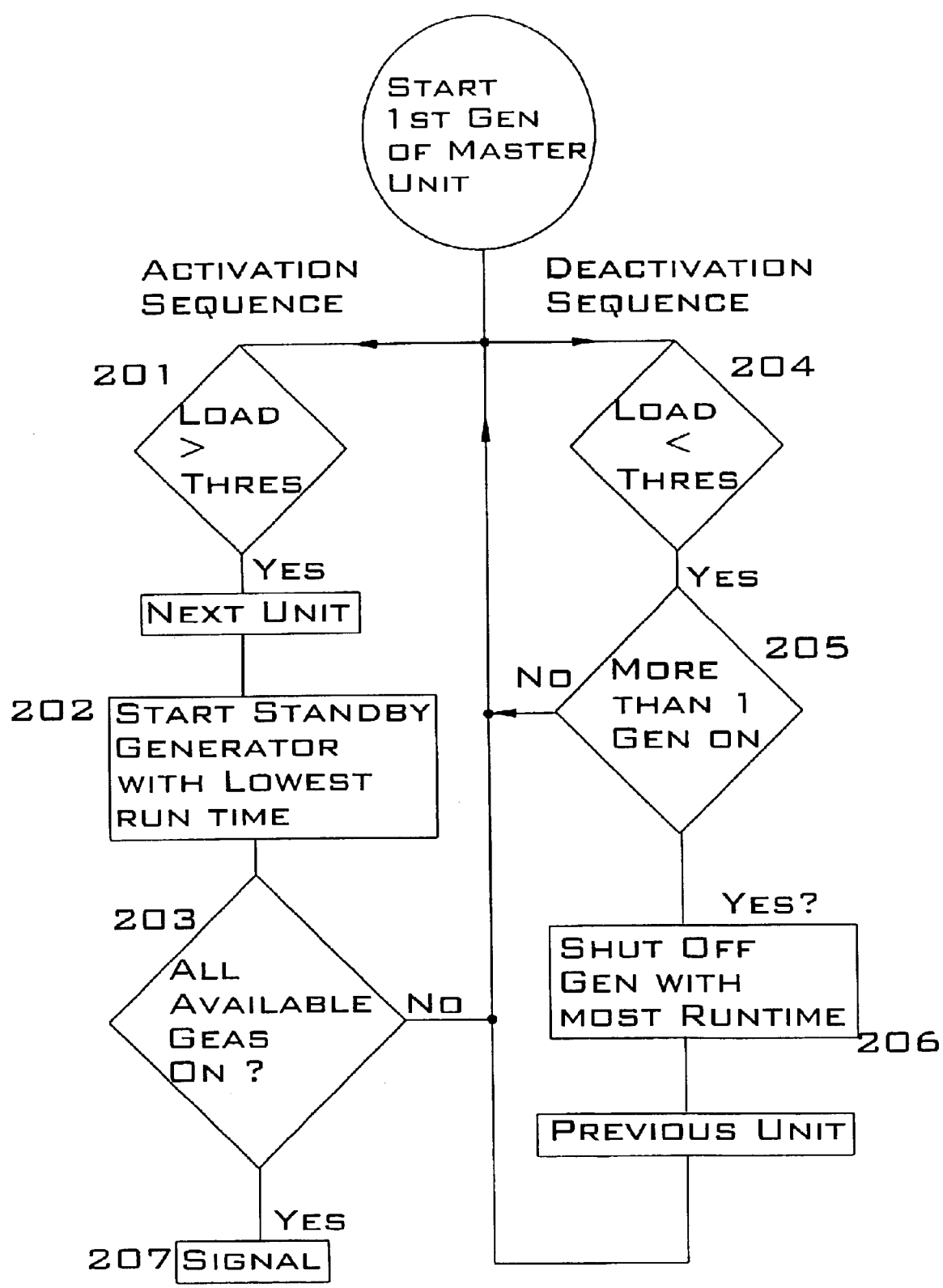
FIG. 2 is a flow chart for adding and subtraction generators in a deployable distributed generator system.

Should the required electrical load exceed the capacity of one power unit, additional units may be added to the system. In one embodiment four power units are networked together providing for eight generators. Adding or removing a power unit does not require the plant to be shutdown, maintaining continuity of power. Added units communicate to the first (master, lead) unit as slave power plants. The first power plant issues commands to the additional plants to add or remove generators based on total system load and the number of available generators. Any one of the four power units may be configured as the first (master,lead) unit without disturbing the power plant output. Along these same lines, a power unit can be removed or replaced from its position in the lineup without affecting power output. During multiple power unit operations, the lead controller, PDC 110 of the lead unit, monitors the load on the power plants. If the load per generator exceeds a threshold 201, in the preferred embodiment an upper threshold of 195 KW/243 KVA, the lead controller instructs an additional generator to parallel 202 to the bus based on a set sequence. The sequence of this process (activation and deactivation) is shown in FIG. 2.

The master unit, with one of its generator sets running, determines the load in relation to an upper threshold and a lower threshold. If the power load is greater than the upper threshold 201 an additional PU is brought online. The generator set in the PU with the lowest runtime 202 is started and connected to the common bus as shown in block. This sequence continues incrementally activating or starting one generator in each PU while the threshold is exceeded until each of the PU has its generator with the lowest runtime activated. If the threshold is still exceeded the master unit through its PDC 110 starts its next generator with the lowest runtime and incrementally starts the next generator with the lowest runtime in each of the interconnected PU until the load fall below the thresholds 204 or all the available generator sets 203 are running. When all the available generator sets are active or started a signal 207 is sent to the master PDC and the operator indicating such.

Figure 3:
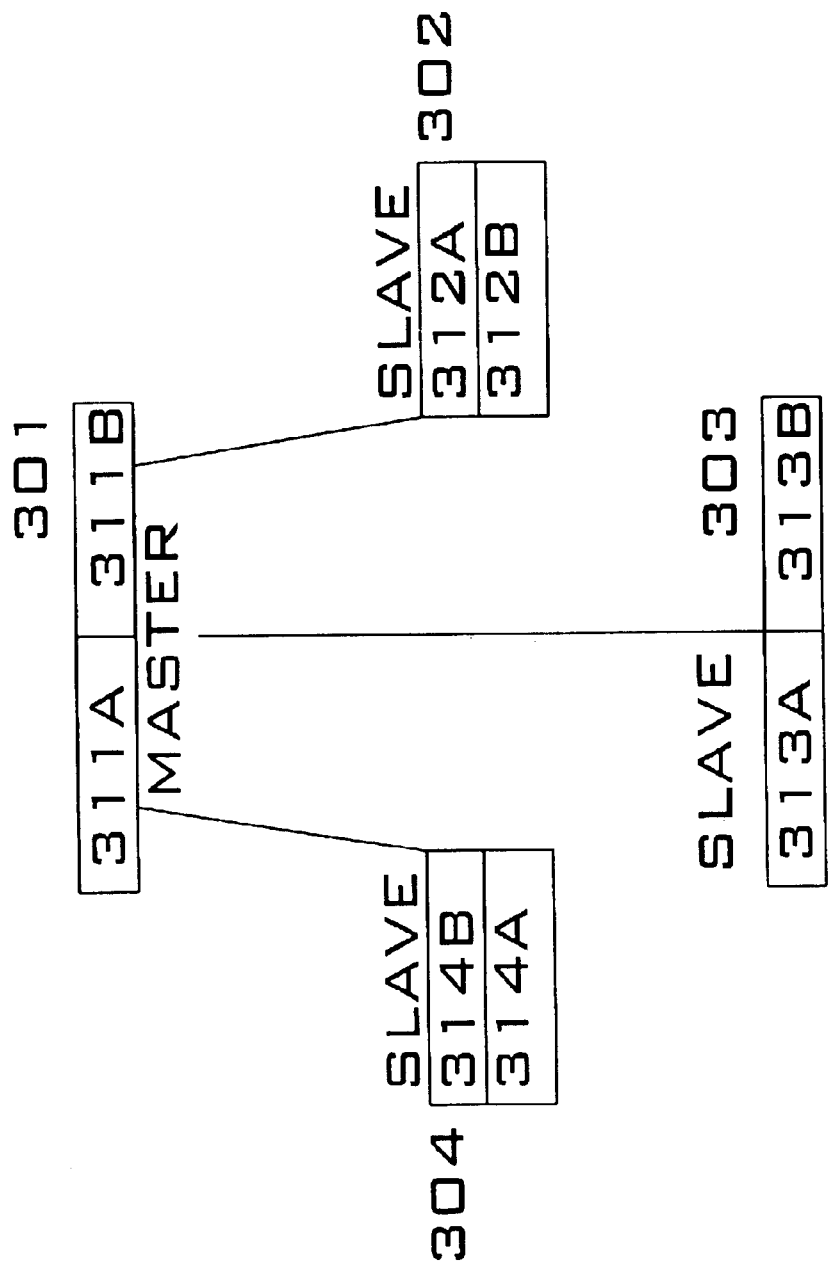
FIG. 3 is a representation of a distributed engine-generator system with four mobile power units with two generator sets each according to an embodiment of the present disclosure.

In the preferred embodiment where there are 4 PUs with 2 generator sets each as shown in FIG. 3 where with the PU 301, 302, 303 and 304 being the lead, second, third, and fourth respectively and the generator sets shown as 311a and b, 321a and b, 331a and b, and 341a and b respectively where a is the generator set with the least amount of runtime. The sequence for this embodiment is as follows (assuming 1 generator from lead unit online) while the upper threshold is exceeded:

Start and parallel the unit with the least runtime from the second power unit.

Start and parallel the unit with the least runtime from the third power unit.

Start and parallel the unit with the least runtime from the fourth power unit.

Start and parallel the remaining generator on the lead power unit.

Start and parallel the remaining generator on the second power unit.

Start and parallel the remaining generator on the third power unit.

Start and parallel the remaining generator on the fourth power unit.

The lead controller follows a reverse sequence under light load conditions (ie. where the load is less than a lower threshold) The lead or master unit through its controller decrementally shuts down 206 generators and takes PUs offline if the load on the 204 remaining online generators is equal to or less, in a preferred embodiment, than 391 KW/486 KVA per generator. While the load is below the lower threshold, generator sets with the most runtime in each PU are shutdown as shown in block 206 until the lower threshold is exceeded or only one generator set is running as shown in decision block 205. This keeps the operating generators at their peak efficiency point. Under no conditions will the last generator be commanded to shutdown by the lead controller to maintain continuity of power.

These generator sets operate isochronously meaning they run at a constant frequency regardless of load up to their rated capacity, in the preferred embodiment, 60 Hz and 460 KW, respectively. Isochronous operation also means that the generators do not have to have their operating voltage and frequency constantly adjusted for load changes.

The power units may also be operated against a power grid. This allows the units to provide supplemental power to a power grid during relief missions or power outages. During parallel operations with a power grid, the generators are operated in baseload mode. The generators in this mode will assume a fixed load from the power grid freeing up the grid's generator capacity. The amount of load assumed by the power units is adjustable from 25 KW per generator to 460 KW per generator in the preferred embodiment.

Also available to the power plant operator is a remote monitoring computer. This computer, called an ORT (Operator Remote Terminal) 123, connects to any one of the networked power units using a standard CAT5e Ethernet cable. Once connected the operator has complete operational control of the networked units. The ORT does not assume control; rather it provides the operator remote monitoring and control capability. The operator can also change the power plant lineup to facilitate removal of a power unit for maintenance or repair. All engine/generator operating parameters are made available to the operator at the ORT 123. The ORT 123 provides the operator with an audio alarm as well as an alarm log should a fault occur on one of the units.

The present support frame for the power unit allows the unit to be deployed by aircraft. While the typical two generator power unit of similar electrical capacity exceeds air transportability and deployability requirements, novel structural solutions of the present disclosure allows for full compliance with the mobility requirements. The support structure of a two engine-generator power unit is shown in FIGS. 4–8. The spine truss 401 is constructed of upper and lower longitudinal members (stringers) 402 and 403, respectively. In a preferred embodiment, the stringers are constructed of beams, i.e., C-channels, structural tubing, I-beans etc., that comprise flanges connected by thin webs. The structure of the spine truss 401 frame contains vertical 404 and angled truss members 405 at several stations along the length of the unit which connect the upper and lower longitudinal members, 402 and 403. The vertical 404 and angled 405 truss members of the spine truss 401 carry the shear stresses induced in the spine truss 401 while the upper and lower longitudinal members primarily carry axial stress. The spine truss 401 extends from the lower longitudinal member 403 vertically between the engine-generator sets, 701 and 702 of FIG. 7, to the upper longitudinal member 402. The amount of vertical extension between the longitudinal members is a function of the load, longitudinal length and strength of the material used in the members.

Figure 4:
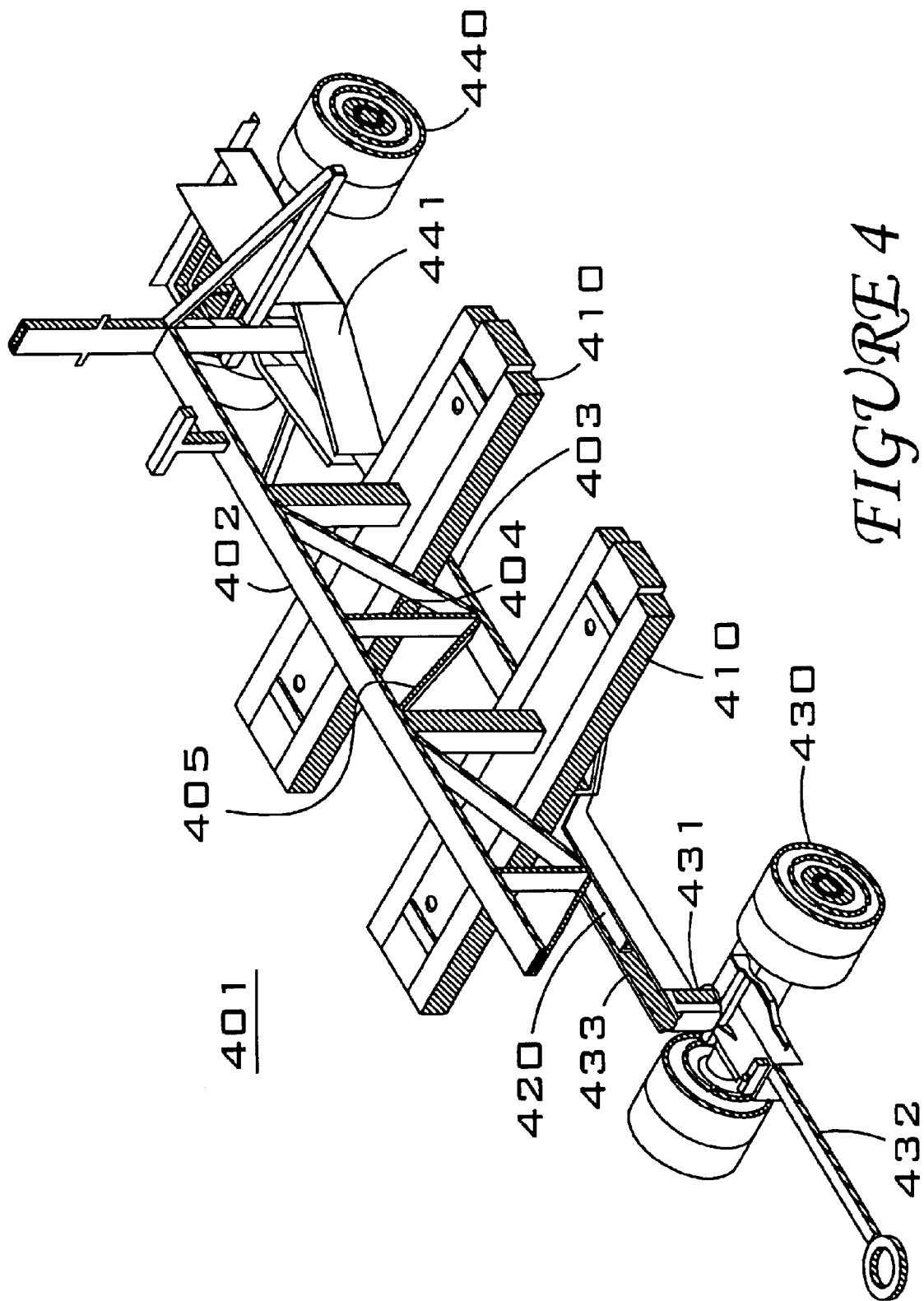
FIG. 4 is a representation of a spine truss according to an embodiment of the present disclosure.

The rear of the spine truss 401 is attached to an axle and ground engaging wheels 440. In a preferred embodiment a single axle is used however embodiments utilizing multiple bogies are also envisioned. The front of the spine truss 401 is attached to a forward bogie as shown in FIG. 4, or alternatively adapted to be used with a fifth wheel structure as is well known in the art (not shown). The forward bogie may also have a yoke 432. The forward axle or bogie has a vertical laterally center post 431 and a tongue receiving member 433 for receiving a tongue 420 extending generally horizontally from the spine truss. The front axle is attached in a manner that allows movement about the vertical axis to facilitate turning the power unit (mobile engine-generator). The spine truss 401 is therefore pivotally connected to the center post 431 of the front axle and rigidly connected to the rear axial 440 and prevented from rotation by supports 441. All of the loads resulting from the mobile engine-generator static and dynamic are transferred to the rear and front bogies through the spine truss 401. The vertical web of the spine truss comprising the vertical 404 and angled 405 truss members is sufficient to support the weight of the engine-generators, frame and skin 801.

The spine truss 401 supports a plurality of transverse load support members 410 that support the engine-generator sets in a cantilever fashion. The transverse load support members 410 extend laterally from the spine truss 401. The transverse load support members 410 are connected at their midpoint to the spine truss 401 and are connected at distal ends to a frame of the outer shell. Each of the transverse load support members 410 are bilaterally symmetric and transfer the loads of the engine-generator sets and the load of the outer shell to the spine truss 401. The transverse load support members 410 are attached to the spine truss 401 between the upper and lower longitudinal members. The location of their attachment in relationship to the longitudinal members is governed by ground clearance and center of gravity considerations.

The transverse load support members 410 shape can be tapered from the center to the distal ends as a function of the moment present along their transverse direction following typical structural design. This optimization reduces the weight associated with the traverse load support members.

The outer shell is formed with a frame and an outer skin. The frame is a box structure constructed from C-channel, I beans, or structural tubing. The outer shell 500 has two side frames each having upper and lower longitudinal frame members 501 and 502 respectively and a plurality of vertically extending frame members 503. The side frames are supported by the load support members 410 at the lateral extremities on both lateral sides of the spine truss 401. A plurality of top frame members 504 rigidly connect the upper longitudinal frame members 501 of the side frame at the front and rear of the frame forming forward and rearward facing frame ends 550 and 552 as shown in FIG. 5. Upper longitudinal frame members 501 are rigidly connected to top frame members 504 with joints 520. The frame is bilaterally symmetric in the same manner as the transverse load support members 410 and transfers its load to the spine truss 401 via the transverse load support members 410. An outer skin or thin walled skin 801 is connected to the frame members of the side frames and frame ends as well as the top as shown in FIG. 8. The thin walled skin 801 or web and carries the sheer stresses associated with the PU.

The combination of the spine truss carrying the load of the PU to the axles and the outer skin 801 carrying the sheer stresses results in a light weight stiff structure. The loads in the structure are also distributed in a substantially bilateral symmetric fashion. This is shown in FIG. 7 where each engine-generator, radiator and etc. on one side of the spine truss 401 is located the same distance therefrom as the same on the other side of the spine truss 401 thus effecting a lateral weight distribution substantially equal on the ground engaging wheels on both sides of the axles. The longitudinal location of the engine-generator and associated equipment is selected to effect a longitudinal weight distribution that substantially equalizes the weight on the front 430 and rear 440 axles. Thus the load paths, stress and strain are thereby distributed in a bilateral symmetric manner and a longitudinal distributed manner as required in air transport.

As shown in FIG. 6 and FIG. 8 a electromagnetic wave energy screen 620 and 820 respectively is employed over open areas of the PU not covered by a thin walled skin 801. Also shown in FIG. 6 is a flat plate 630. Also shown in FIG. 8 is the PDC 810 which is attached to the rear face 552 after air transport. Symmetrically placed fuel tanks 821 and batteries 822 are located on the front face 550.

The PU structure is capable of maintaining a linear stress-strain relation which in turn will maintain degrees of freedom in the areas of load concentration, torsional stresses, load distribution, as well as maintaining a center of twist that meets air transportability and deployability requirements. The structure meets these requirements while maintaining a minimum stationary condition in an equilibrium state, that is required to make the unit deployable by the aircraft, while staying within the weight limit and weight distribution constraints required by the C-130 aircraft, i.e., approximately 26,000 lbs, having substantially equal weight distribution per axle, per wheel. The use of such a structure enables the mobile engine-generator to have a weight to power ratio or specific weight of 25 lbs/KW.

The support structure maintains degrees of freedom in the transverse, longitudinal, bending and twisting axis. The structure utilizes the sheet-stringer construction concept. This concept uses beams that consist of flanges connected by very thin webs. Stringers carry most of the axial stress and sheets carry most of the sheer stresses. These transverse members distribute sheer flow loads constantly around any given cross section of the load bearing sheets.

The unit design structure applies standard beam formulas, where the Spinal from all symmetrical distances of all the sheer carrying sheets of the unit. Centroidal moments of inertias and associated areas each are composed of stringer area plus effective sheets concentrated at centroids with symmetrical distances from the spinal structure. The design exploits the statue determinacy of the structure, and ensures equilibrium about major parts and force equilibrium in vertical direction.

The design is a short step to idealize such a beam by saying that a stringer carries only axial stresses and a sheet carries only sheer stresses, which is constant through the thickness of the material of the power unit. Utilizing this concept allows the use of relatively thin material, represented here by the skin/housing of the power unit, to carry the sheer stresses imposed on the unit during air transportation and operation sheer stresses resulting from vibration forces. The structure is therefore capable of supporting static loads as well as dynamic loads seen during transportation and operations stresses.

What is claimed is:

1. A power generating unit for a deployable power generating and distributing system comprising:

a front axle having ground engaging wheels, a vertical laterally centered post and a tongue extending generally horizontally and forwardly from said post a rear axle having ground engaging wheels;

a spine truss pivotably connected to the center post of said front axle and rigidly connected to said rear axle at the lateral center thereof, said spine having upper and lower vertically spaced apart longitudinal members and a plurality of vertical and angled truss members extending between said longitudinal members;

a plurality of transverse load support members each cantileverly extending laterally from said spine truss at a point vertically intermediate said longitudinal members on opposite sides thereof;

a motor-generator supported by said load support members on each side of said spine truss, two side frames each having upper and lower longitudinal frame members and a plurality of vertically extending frame members, said side frames being supported by said load support members at the lateral extremities thereof on both lateral sides of said spine truss;

a plurality of top frame members rigidly connecting the upper longitudinal frame members of said side frames at the front and rear extremities thereof to thereby form forwardly and rearwardly facing frame ends; and a thin walled skin for each of said side frames and said frame ends.

2. The power generating unit of claim 1 wherein said skin maintains substantially uniform sheer forces.

3. The power generating unit of claim 1 wherein the vertical web of said spine truss is sufficient to support the weight of said motor-generators, frame and skin.

4. The power generating unit of claim 1 wherein said motor-generator and any associated equipment is positioned relative to said spine truss to effect a longitudinal weight distribution which substantially equalizes the weight on said front and rear axles.

5. The power generating unit of claim 4 wherein said associated equipment includes a power distribution unit and an electromagnetic wave energy screen.

6. The power generating unit of claim 4 wherein said associated equipment includes a fuel tank for the emergency operation of said motor generator.

7. The power generating unit of claim 1 wherein said motor-generator and any associated equipment is positioned relative to said spine truss to effect a lateral weight distribution which substantially equalizes the weight on the ground engaging wheels of both of said axles.

8. The power generating unit of claim 1 including a generally horizontal pan carried by said support members to contain any environmentally harmful fluids leaking from said motor-generator and associated equipment.

9. The power generating unit of claim 1 wherein unit has the capacity of approximately 1 KW/ 25 pounds of weight.

10. The power generating unit of claim 1, wherein the front axle is a towing apparatus interconnected with the unit via a fifth wheel connection.

11. The power generator unit of claim 1, wherein container interlocks are located on the top corners of the side frames.

12. The power generating unit of claim 1, wherein a processor is detachably connected to the rearward facing frame ends.

13. A power generating unit for a deployable power generating and distributing system comprising:
a spine truss connected to front and rear axles each having ground engaging wheels; a plurality of transverse load support members each cantileverly extending laterally from said spine truss at a point vertically intermediate the height of said spine truss; and
a motor-generator and associated equipment supported by said load support members on each side of said spine truss.

14. A power generating unit for a deployable power generating and
distributing system comprising:
a central longitudinal spine connected to front and rear axles each having ground engaging wheels;
a plurality of support members cantileverly extending laterally from said spine; and,
two motor-generators and associated equipment supported by said load support members, said motor-generators and associated equipment being positioned with respect to said spine to effect bilateral and bi-longitudinal weight distribution on said wheels.

15. A power generating unit for a deployable power generating and distributing system comprising:
a central longitudinal spine connected to front and rear axles each having ground engaging wheels;
a plurality of transverse load support members each cantileverly extending laterally from said spine;
a motor-generator and associated equipment supported by said load support members on each side of said spine, said spine having a vertical web dimension sufficient to support the weight of said motor-generators and associated equipment and said support members being attached to said spine at a point vertically intermediate the web thereof.

16. A power generating unit for a deployable power generating and distributing system comprising:
front and rear axles each having ground engaging wheels;
a spine truss pivotably connected to said front axle and rigidly connected to said rear axle;
two motor-generators and associated equipment cantileverly suspended from said spine truss to apply bilateral and bi-longitudinal weight distribution on said wheels.

17. A power unit for a deployable power generator distribution center comprising:
at least one generator set, each generator set comprising an engine and a mechanical power to electrical power converter;
a main bus operably connecting each generator set and a power output;
a processor operably connected to each generator set and said main bus;
a communication link, said link operably connected to said processor;
wherein said processor controls the operation of said main bus and each generator set;
a switch, said switch operably connected to the processor for switching the processor between master and slave modes;
wherein in said slave mode the processor is controlled via said communication link and in said master mode, the processor sends control signals over the communication link, and
front and rear axles each having ground engaging wheels wherein;
each said generator and associated equipment is supported by said axles with bilateral and bilongitudinal weight distribution on said wheels.

18. The mobile engine-generator of claim 17, comprising a plurality of contactors that are programmable via the communication link.

19. The mobile engine-generator of claim 17, wherein the processor comprises engine-generator monitoring functions.

20. The mobile engine-generator of claim 17, wherein the number of generator sets is two.

21. The mobile engine-generator of claim 17, wherein the mechanical power to electrical power converter is a DC generator.

22. The mobile engine-generator of claim 17, wherein the mechanical power to electrical power converter is an AC alternator.

23. The mobile engine-generator of claim 17, wherein the processor is remote controlled.

24. The mobile engine-generator of claim 17, wherein the processor is a slave.

25. The mobile engine-generator of claim 17, wherein the processor is a master.

26. The mobile engine-generator of claim 17, wherein the generators sets are isochronous.

27. The power unit according to claim 17, further comprising:
a support frame comprising:
the front axle having ground engaging wheels, a vertical laterally centered post and a tongue extending generally horizontally and forwardly from said post
the rear axle having ground engaging wheels;
a spine truss pivotably connected to the center post of said front axle and rigidly connected to said rear axle at the lateral center thereof, said spine having upper and lower vertically spaced apart longitudinal members and a plurality of vertical and angled truss members extending between said longitudinal members;
a plurality of transverse load support members each cantileverly extending laterally from said spine truss at a point vertically intermediate said longitudinal members on opposite sides thereof;
a plurality of top frame members rigidly connecting the upper longitudinal frame members of said side frames at the front and rear extremities thereof to thereby form forwardly and rearwardly facing frame ends; and
a thin walled skin for each of said side frames and said frame ends,
wherein each of the at least one generator set and associated equipment are supported by said load support members on each side of said spine truss, two side frames each having upper and lower longitudinal frame members and a plurality of vertically extending frame members, said side frames being supported by said load support members at the lateral extremities thereof on both lateral sides of said spine truss, providing bilateral and bi-longitudinal weight distribution on said wheels
said associated equipment comprising;
a microprocessor-based controller carried by said frame for monitoring engine and generator parameters and for selectively controlling the operation thereof in response to locally generated operating instructions, programmable software resident within said controller, and remotely generated instructions, said controller having means for visually displaying the monitored parameters and for locally generating operating instructions, means operatively connected to said controller for asynchronous communication with the controllers of the other ones of said mobile engine-generators and a source of remote operating instructions to provide and receive engine and generator parameters and operating instructions, whereby said at least one generator set is adapted to be (a) selectively operated independently of the other engine-generators, (b) operated under the remote control of said source of operating instructions, (c) operated under the control of a controller of another engine-generators or (d) control the operation of the other engine-generators.

28. In a deployable distributed engine-generator system comprising a plurality of power units interconnected by a communication line and interconnected in parallel by a common power bus, wherein one of said plurality of power units is configured as a master and the others of said plurality of power units configured as slaves, each of said plurality of power units comprising at least one generator set, a method of controlling generation capacity by the master comprising the steps of:

(a) determining a system load in relation to an upper and lower threshold;

(b) sequencing said plurality of power units, (c) incrementally bringing online said plurality of power units while the system load exceeds the upper threshold;

(d) decrementally taking offline said plurality of power units while the system load is below the lower threshold, wherein the step of incrementally bringing online comprises the steps of:

(i) starting incrementally in of each of said plurality of power units, one of the generator sets not started having the least runtime;

(ii) repeating step (i) while the system load exceeds the upper threshold.

29. The method of claim 28, wherein the step of decrementally taking offline comprises the steps of:

(i) shutting off decrementally in of each of said plurality of power units, one of the generator sets started having the greatest runtime;

(ii) repeating step (i) while the system load is below the lower threshold.

30. The method of claim 28, wherein the upper and lower thresholds are maximum load per started generator set and minimum load per started generator set respectively.

31. The method of claim 28, wherein the number of power units is four and the number of generator sets is two and the step of incrementally bringing online said plurality of power units comprises the steps of:

starting one of the generator sets having the least runtime in the second power unit;

starting one of the generator sets having the least runtime in the third power unit;

starting one of the generator sets having the least runtime in the fourth power unit;

starting the other generator set in the first power unit;

starting the other generator set in the second power unit;

starting the other generator set in the third power unit; and, starting the other generator set in the fourth power unit.

32. The method of claim 28, wherein the number of power units is four and the number of generator sets is two and the step of decrementally taking offline said plurality of power units comprises the steps of:

shutting off one of the generator sets having the greatest runtime in the fourth power unit;

shutting off one of the generator sets having the greatest runtime in the third power unit;

shutting off one of the generator sets having the greatest runtime in the second power unit;

shutting off one of the generator sets having the greatest runtime in the first power unit;

shutting off the other generator set in the fourth power unit, shutting off the other generator set in the third power unit; and, shutting off the other generator set in the second power unit.

33. The method of claim 28, wherein the distributed engine-generator system is operably connected to a power grid and the load is fixed.

34. The method of claim 28, wherein the load is dynamic.

35. A distributed engine-generator system comprising:

a plurality of mobile engine-generators, each mobile engine-generator comprising:

a frame with front and rear axles having ground engaging wheels, at least two engine driven generators carried by said frame, so that the wheels are exposed to a uniform bilateral and bilongitudinal weight distribution a microprocessor-based controller carried by said frame for monitoring engine and generator parameters and for selectively controlling the operation thereof in response to locally generated operating instructions, programmable software resident within said controller, and remotely generated instructions, said controller having means for visually displaying the monitored parameters and for locally generating operating instructions, and means operatively connected to said controller for asynchronous communication with the controllers of the other ones of said mobile engine-generators and a source of remote operating instructions to provide and receive engine and generator parameters and operating instructions, whereby each of said plurality of mobile engine-generators may be (a) selectively operated independently of the others of said plurality of mobile engine-generators, (b) operated under the remote control of said source of operating instructions, (c) operated under the control of the controller of another one of said plurality of mobile engine-generators or (d) control the operation of others of said plurality of mobile engine-generators.

36. The distributed engine-generator system control system of claim 35 wherein the controller of each of said mobile engine-generators monitors the speed, coolant temperature, oil pressure, runtime, and battery voltage of the associated engine.

37. The distributed engine-generator system control system of claim 35 wherein the controller of each of said mobile engine-generators monitors the individual phase voltage and current, generator kilowatts (KW), kilovolt amps reactive (KVAR), apparent power (KVA), power factor, and frequency of the associated generator.

38. The distributed engine-generator system control system of claim 34 wherein the controller of each of said mobile engine-generators monitors differential engine filter pressures for maintenance, the associated generator for any alarm or fault conditions.

* * * * *